Nov. 25, 1969     R. M. VOITIK     3,480,284

VENTED LABYRINTH SEAL

Filed July 24, 1967

INVENTOR.
ROBERT M. VOITIK,
BY
Wolfe, Hubbard, Voit & Osann
ATTORNEYS.

United States Patent Office 3,480,284
Patented Nov. 25, 1969

3,480,284
VENTED LABYRINTH SEAL
Robert M. Voitik, Glenview, Ill., assignor to Continental Illinois National Bank and Trust Company of Chicago, trustee
Filed July 24, 1967, Ser. No. 655,425
Int. Cl. F16j *15/34, 15/54*
U.S. Cl. 277—26                                                           1 Claim

ABSTRACT OF THE DISCLOSURE

A labyrinth type seal formed of stator elements with a rotor mounted on a shaft between them in which the rotor has an annular groove extending about its inner surface and in which an auxiliary passageway is provided in the rotor and adjacent stator element for venting the groove to inhibit leakage along the shaft particularly under cool, static conditions. In a second mode of operation the passageway is pressurized.

Description of the invention

In one type of labyrinth seal a rotor is provided on the shaft between two stator elements and closely spaced with respect to each of them. In Laser U.S. Patent 2,917,329, which issued Dec. 15, 1959, the rotor is slidable on the shaft under relatively cool conditions to permit endwise axial movement of the shaft but tends to seize the shaft under high temperature running conditions. In order to avoid the leakage which might occur along the shaft through the seal assembly under cool conditions, and particularly when the shaft is standing still, a dual rotor is used and gas under pressure is introduced between them as taught in Laser U.S. Patent 2,971,783, which issued Feb. 14, 1961.

It is an object of the present invention to provide a shaft seal which possesses the advantages of the prior dual rotor seal but which is simpler, less expensive and more compact. It is another object of the present invention to provide a shaft seal which is capable of operating as a vented seal without need for a source of pressurized gas.

Other objects and advantages of the invention will become apparent upon reading the attached detailed description and upon reference to the drawing in which.

While the invention has been described in connection with certain preferred embodiments, it will be understood that I do not intend to limit the invention to those embodiments but on the contrary intend to cover such further alternative constructions as may be included within the spirit and scope of the appended claims.

Figure 1:
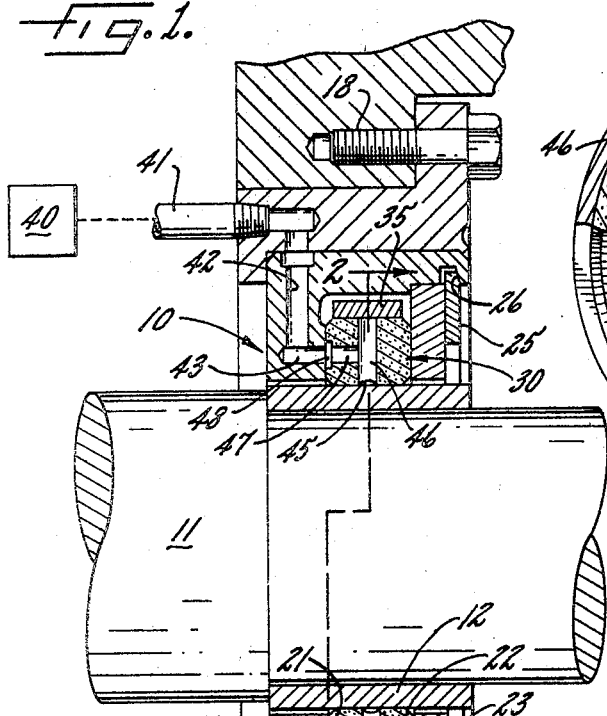
FIGURE 1 is a sectional view taken radially through a seal constructed according to the present invention.

Turning first to FIGURE 1 there is shown a seal assembly 10 surrounding a rotatable shaft 11. The shaft carries a tightly fitting sleeve 12 which rotates with it. The purpose of the sleeve is to provide a more easily handled and machined outer shaft surface, but it will be understood that the sleeve is not essential to the invention and that the surface of the shaft itself can be properly machined and finished to perform the desired sealing function.

The seal assembly has a main body or housing 15 with an integral annular flange 16 having a plurality of circumferentially spaced holes 17 for receiving bolts 18 which are screwed in place in the wall 19 of a pressurized container through which the shaft 11 passes. The seal housing 15 is hollow to provide an annular chamber 20 bounded by walls presenting flat, opposed sealing surfaces 21, 22. The surface 21 is preferably integral with the housing 15, while the surface 22 is preferably formed on a stator element or ring 23 which is seated, at its periphery, on an internal shoulder 24 formed in the housing. The stator ring 23 is maintained in place by a flat retaining or "snap" ring 25 which is held in a groove 26 extending about its periphery. Occupying the chamber 20 between the stator surfaces 21, 22 is a rotor 30 having cooperating sealing surfaces 31, 32, respectively, as well as a cylindrical inner surface 33. Surrounding the rotor is a retaining or reinforcing ring 35. Since the rotor is preferably made of carbon, the reinforcing ring 35 provides physical support, opposing the centrifugal forces which are developed in the rotor when the rotor operates at high speed, keeping in mind that seals of the present type are suitable for use on shafts which rotate up to 150,000 r.p.m. or even higher.

The sealing surfaces 21, 22 and 31, 32, as well as the inner surface 33 of the rotor are finished with a high degree of surface accuracy, measured in millionths of an inch. The inner diameter of the rotor is less than the inner diameter of the stator surfaces on each side of it and just slightly greater than the outer diameter of the ring 12 on the shaft which it encircles. Thus under cool, static conditions the rotor is preferably snugly slidable on the ring 12. As the machine is started up and gradually comes up to operating temperature, the endwise movement of the shaft, due to expansion, may be accommodated by relative sliding movement of the rotor. The temperature coefficients of the material forming the rotor and the metal forming the sleeve are preferably such that the clearance between the rotor and sleeve is decreased and, if desired, the parameters may be such that the rotor actually seizes the sleeve when the full operating temperature is reached; as to this possibility, reference is made to the above patents.

Also as described in the above mentioned patents, rotation of the rotor at high speeds causes any molecules of gas at the interfaces between sealing surfaces 21, 31 and 22, 32 to be thrown outwardly to develop a high static pressure in the chamber 20 which tends to resist any escape of the contained pressure fluid, from right to left in the disclosed embodiment, along the outside surface of the rotor. Escape of the contained fluid along the inside surface of the rotor under running conditions is prevented by the close fit of the finely machine annular surfaces.

Figure 3:
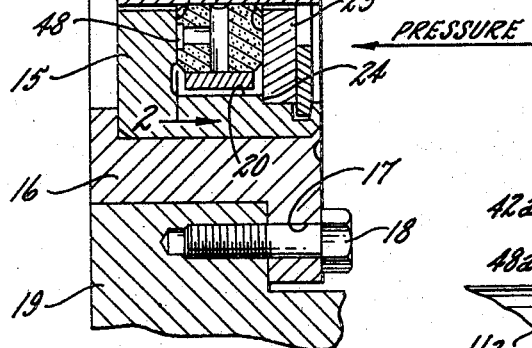
FIG. 3 is an enlarged fragmentary section taken through the rotor.

In accordance with the present invention an annular groove is formed about the inner surface of the rotor and an auxiliary passageway is provided from the groove and adjacent stator element for venting of the seal outside of the seal housing, particulraly during cool, static conditions when slight clearance exists between the rotor and shaft. In the preferred embodiment of the invention a suitable receiver 40 is connected to an auxiliary passageway formed of a conduit 41 and a radial bore 42 thence through an axial bore 43 which terminates at the sealing surface 21. The rotor has an annular groove 45 which extends about its inner surface and which communicates, by a radial bore 46 and an axial bore 47, with the sealing surface 31 thereon. The two axially extending bores 43, 47, in the stator and rotor, respectively, preferably lie at the same radius. To insure communication between them at all angular positions of the rotor, the rotor is provided with a shallow annular communication groove 48, such groove being preferably formed in the central portion of the sealing surface 31 as shown in FIG. 3. The grooves 45, 48 are preferably machined directly in the rotor, rather than in the surfaces engaged by the rotor, since the rotor material is easily machined and to avoid affecting the integrity of the surfaces on the stator and on the shaft.

Figure 2:
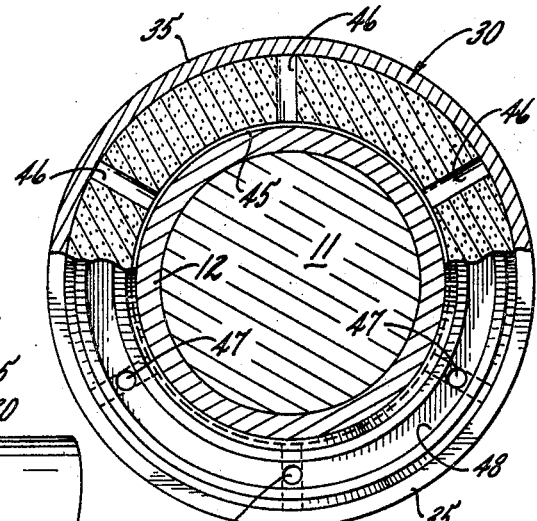
FIG. 2 is a transverse section taken along the line 2—2 of FIG. 1 and showing the end profile of the rotor.
Figure 4:
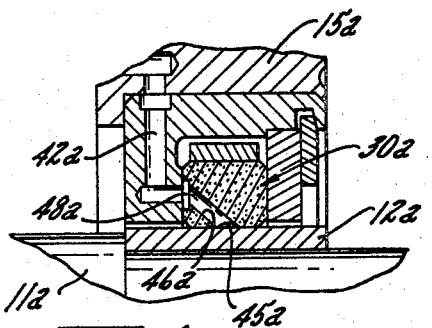
FIG. 4 is a fragmentary sectional view similar to FIG. 1 but showing a modified embodiment of the invention.

Forming the hole between the two grooves as a combination of axial and radial bores in an economy measure. As shown in FIG. 2, the bores are preferably provided in multiple, for example, six in number, equally spaced about the periphery. After the radial bores are drilled, the reinforcing ring 35 may be pressed in place to seal the outer ends thereof. However, as desired, the holes which connect the grooves may be drilled at an angle as shown at 46a in FIG. 4, corresponding parts being represented in this figure by corresponding reference numerals with the addition of subscript a.

Under normal high temperature operating conditions, the seal functions much the same as that described in the first one of the Laser patents referred to above. That is, the close fit of the rotor prevents leakage along the shaft, and the centrifugal action, building up pressure in the chamber 20, combined with small clearances at the axially facing sealing surfaces, tends to prevent leakage around the rotor. However in the static, low temperature condition, at which time the rotor is slidable with respect to the shaft, sufficient clearance exists inside the rotor so that there tends to be leakage along the shaft. In the present construction such leakage is diverted, by the auxiliary passageway beginning at the groove 45, into the receiver 40 which lies outside of the seal housing. The cross sections in the various portions of the auxiliary passageway are sufficiently great, as compared to the clearance between the left-hand portion of the rotor and the shaft so that substantially all of the escaping fluid follows the diversion path. The leakage along the shaft to the outside of the housing is found to be substantially nil under a wide variety of operating conditions to which a labyrinth type seal is applicable.

I claim as my invention:

1. A fluid seal for a rotatable shaft comprising, in combination, a seal housing, an annular stator surrounding the rotatable shaft, said stator having a pair of opposed inner and outer radial walls with flat, lapped, sealing surfaces, a cylindrical sealing surface formed on said shaft and disposed within the surrounding stator, an annular rotor for surrounding the shaft intermediate the stator surfaces and closely adjacent each of them, said rotor having inner and outer end walls lapped smooth and parallel for engagement with the inner and outer walls respectively of the stator to form a seal, said rotor being fitted to the engaged portion of the shaft so as to be slidable thereon under relatively cool conditions thereby to permit axial expansion of the shaft, said rotor and said shaft being formed of materials having different thermal coefficients of expansion so that the rotor tends to be seized by said shaft under high temperature running conditions for continued rotation therewith, said rotor having a first annular groove extending about its inner surface and a second annular groove extending about its outer end wall, said rotor having a hole providing communication between the grooves, the stator adjacent the second groove having an auxiliary passageway alined with the second groove for venting of the first groove externally of the housing thereby to inhibit leakage of the contained fluid from the housing between the rotor and the shaft under conditions of relatively low temperature.

References Cited
UNITED STATES PATENTS

| | | | |
|---|---|---|---|
| 2,917,329 | 12/1959 | Laser | 277—26 |
| 3,047,299 | 7/1962 | Karsten | 277—74 X |
| 3,190,661 | 6/1965 | Wahl et al. | 277—75 |

SAMUEL ROTHBERG, Primary Examiner

U.S. Cl. X.R.

277—29, 41